Jan. 29, 1929.                                         1,700,613
R. H. MEIGS
HANDLE FOR KITCHEN UTENSILS
Original Filed June 6, 1925

Robert H. Meigs, INVENTOR
BY Victor J. Evans
ATTORNEY

WITNESS:
P. J. Hickey

Patented Jan. 29, 1929.

1,700,613

UNITED STATES PATENT OFFICE.

ROBERT H. MEIGS, OF MUSKOGEE, OKLAHOMA.

HANDLE FOR KITCHEN UTENSILS.

Application filed June 6, 1925, Serial No. 35,399. Renewed May 31, 1928.

This invention has for its object the attachment of a handle to a lid or the like of kitchen utensils and similar articles, the purpose of the invention being to cheapen the cost of manufacture and avoiding the formation of openings in the lid in attaching the handle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:—

Figure 1:
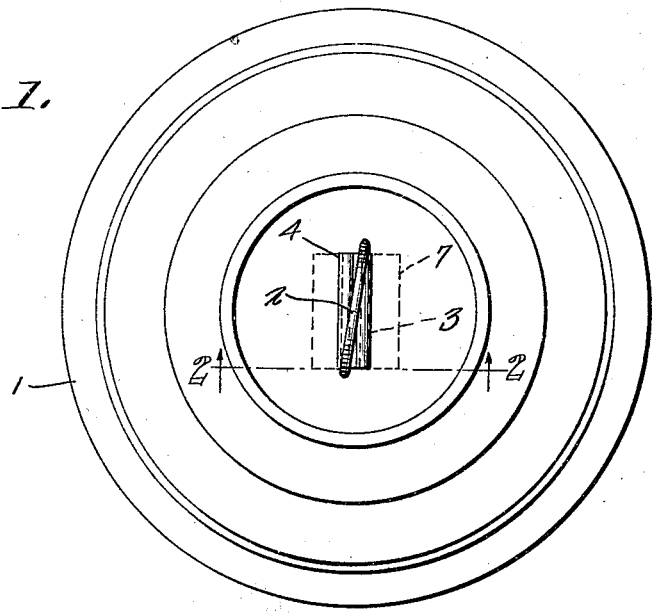
Figure 1 is a plan view showing a lid provided with my invention.
Figure 5:
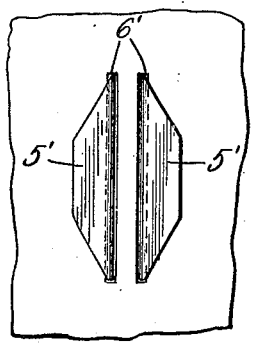
Figure 5 is a bottom plan view of Figure 6.
Figure 2:
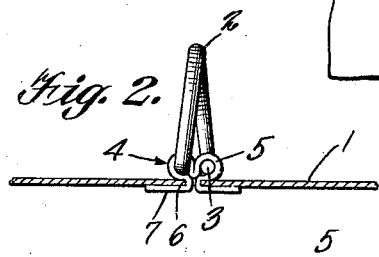
Figure 2 is a section on line 2—2 of Figure 1.

In these views, 1 indicates a lid or cover and 2 indicates the handle for the same. This handle is formed of wire bent into semi-circular shape, with its ends 3 arranged parallel to each other and forming the flat side of the semi-circle. A clip 4, formed from a single blank of metal, holds the handle on the lid. This clip is formed with a double loop 5 to receive the parts 3 of the handle and then the end parts of the clip are passed through a slot 6 formed in the lid and bent over, as shown at 7. Thus the clip clamps the lid between the looped portions 5 and the part 7, with the parts 3 of the handle engaging the loops 5. Thus the handle is attached to the lid so that the lid can be picked up without danger of burning the fingers. The clip fills up the slots so as to leave no openings in the lid.

Figure 6:
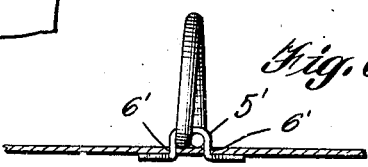
Figure 6 is a view similar to Figure 2, but showing a modification.
Figure 3:
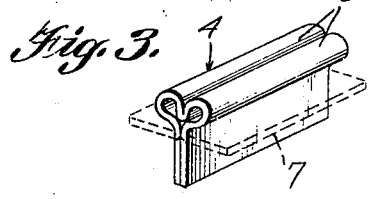
Figure 3 is a view of the clip for holding the handle to the lid.
Figure 4:
Figure 4 is a view of the handle.
Figure 7:
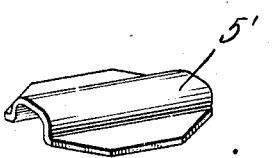
Figure 7 is a view of the clip shown in Figure 6.

Instead of making the clip with a double loop, I may make it with a single loop, as shown at 5' in Figures 6 and 7, so that the portions 3 of the handle contact with each other while engaging the looped part of the clip. In this case also, a pair of slots 6' is formed in the lid to receive the end of the clip so that in this case the handle contacts with the lid, as shown in Figure 6.

Attention is called to the fact that the parts 3 of the handle are of less length than the widest part of the curved part of the handle so that the handle can be pushed down against the lid and then when it is released, it will fly up to a vertical position again. This will permit a plurality of lids to be packed together.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a lid having a slot therein, a handle formed of a piece of wire bent into semi-circular shape with its ends overlapping and parallel, a clip bent into loop shape with its ends passing through the slot and bent over against the bottom of the lid, the parallel ends of the handle engaging the looped portion of the clip and holding the handle upright.

2. In combination with a lid having a loop thereon, a handle formed of a bent portion of spring wire with its ends overlapping and extending parallel to each other in a horizontal plane, said ends engaging the looped part and tending to hold the handle in upright position.

In testimony whereof I affix my signature.

ROBERT H. MEIGS.